US012547872B2

(12) United States Patent
Darvish Rouhani et al.

(10) Patent No.: US 12,547,872 B2
(45) Date of Patent: Feb. 10, 2026

(54) MACHINE LEARNING MODEL PROCESSING BASED ON PERPLEXITY

(71) Applicant: Microsoft Technology Licensing, LLC, Redmond, WA (US)

(72) Inventors: Bita Darvish Rouhani, Bellevue, WA (US); Douglas Christopher Burger, Bellevue, WA (US); Eric S Chung, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 906 days.

(21) Appl. No.: 17/657,606

(22) Filed: Mar. 31, 2022

(65) Prior Publication Data

US 2023/0316043 A1 Oct. 5, 2023

(51) Int. Cl.
*G06N 3/0495* (2023.01)
*G06N 3/042* (2023.01)
*G06N 3/08* (2023.01)

(52) U.S. Cl.
CPC ........... *G06N 3/042* (2023.01); *G06N 3/0495* (2023.01); *G06N 3/08* (2013.01)

(58) Field of Classification Search
CPC .......... G06N 3/042; G06N 3/08; G06N 3/092; G06N 3/0495; G06N 3/045
See application file for complete search history.

(56) References Cited

U.S. PATENT DOCUMENTS

2019/0251423 A1* 8/2019 Shazeer ................. G06N 3/045
2023/0316042 A1 10/2023 Darvish Rouhani et al.

OTHER PUBLICATIONS

Shazeer et al."Outrageously Large Neural Networks:The Sparsely-Gated Mixture-Of-Experts Layer" dated Jan. 23, 2017 and retrieved from arXiv: 1701.06538v1 (Year: 2017).*
Fedus, et al., "Switch Transformers: Scaling to Trillion Parameter Models with Simple and Efficient Sparsity", In Repository of arXiv:2101.03961v1, Jan. 11, 2021, 31 Pages.
"International Search Report and Written Opinion Issued in PCT Application No. PCT/US23/010644", Mailed Date: Apr. 20, 2023, 17 Pages.
Rajbhandari, et al., "DeepSpeed-MoE: Advancing Mixture-of-Experts Inference and Training to Power Next-Generation AI Scale", In Repository of arXiv:2201.05596v1, Jan. 14, 2022, 31 Pages.
Riquelme, et al., "Scaling Vision with Sparse Mixture of Experts", In Repository of arXiv:2106.05974v1, Jun. 10, 2021, 43 Pages.
(Continued)

*Primary Examiner* — Sanchita Roy
(74) *Attorney, Agent, or Firm* — Alleman Hall LLP

(57) ABSTRACT

A method for operating a machine learning model is presented. The machine learning model includes a plurality of sequential transformer blocks. The method comprises receiving input data at a transformer block and processing the input data via a mixture of experts layer. At an auxiliary classifier, a measure of perplexity of the processed input data is determined. Based on the determined measure of perplexity, one or more experts in a downstream transformer block
(Continued)

that will subsequently process the input data are indicated. Weight matrices are then fetched for the indicated one or more experts.

18 Claims, 11 Drawing Sheets

(56) References Cited

OTHER PUBLICATIONS

Lepikhin, et al., "GShard: Scaling Giant Models with Conditional Computation and Automatic Sharding", In Repository of arXiv:2006.16668v1, Jun. 30, 2020, 35 Pages.
Liao, et al., "Doubly Sparse: Sparse Mixture of Sparse Experts for Efficient Softmax Inference", In Repository of arXiv:1901.10668v1, Jan. 30, 2019, 10 Pages.
"International Search Report and Written Opinion Issued in PCT Application No. PCT/US23/010639", Mailed Date: May 12, 2023, 12 Pages.
Nie, et al., "EvoMoE: An Evolutional Mixture-of-Experts Training Framework via Dense-To-Sparse Gate", arXiv:2112.14397v2, Oct. 9, 2022, 14 pages.
Non-Final Office Action mailed on Mar. 25, 2025, in U.S. Appl. No. 17/657,604 34 Pages.
Wang, et al., "Deep Mixture of Experts via Shallow Embedding", Proceedings of Machine Learning Research, vol. 115, 2020, 11 Pages.
You, et al., "SpeechMoE: Scaling to Large Acoustic Models with Dynamic Routing Mixture of Expert", Interspeech, Aug. 30, 2021, pp. 2077-2081.
Communication pursuant to Article 94(3) EPC Received for European Application No. 23705122.2, mailed on Sep. 5, 2025, 19 pages.
Final Office Action mailed on Oct. 16, 2025, in U.S. Appl. No. 17/657,604 39 Pages.
Goyal, et al., "A Multimodal Mixture-Of-Experts Model for Dynamic Emotion Prediction in Movies," IEEE International Conference on Acoustics, Speech and Signal Processing (ICASSP), 2016, pp. 2822-2826.
Yuksel, et al., "Twenty Years of Mixture of Experts", In Journal of IEEE Transactions on Neural Networks and Learning Systems, vol. 23, Issue No. 8, Aug. 2012, pp. 1177-1193.
Communication Pursuant to Article 94(3) Received for European Application No. 23705118.0, mailed on Nov. 11, 2025, 06 pages.

* cited by examiner

MACHINE LEARNING MODEL PROCESSING BASED ON PERPLEXITY

BACKGROUND

Neural networks may be trained as components of machine learning models to perform tasks on input data. Such tasks may include image recognition, speech recognition, natural language processing, and other advanced functions. Mixture of experts techniques divide large tasks into subtasks, assign each subtask to an expert, then use gating models to decide which expert to use to process a given input.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for operating a machine learning model is presented. The machine learning model includes a plurality of sequential transformer blocks. The method comprises receiving input data at a transformer block and processing the input data via a mixture of experts layer. At an auxiliary classifier, a measure of perplexity of the processed input data is determined. Based on the determined measure of perplexity, one or more experts in a downstream transformer block that will subsequently process the input data are indicated. Weight matrices are then fetched for the indicated one or more experts.

DETAILED DESCRIPTION

Figure 1:
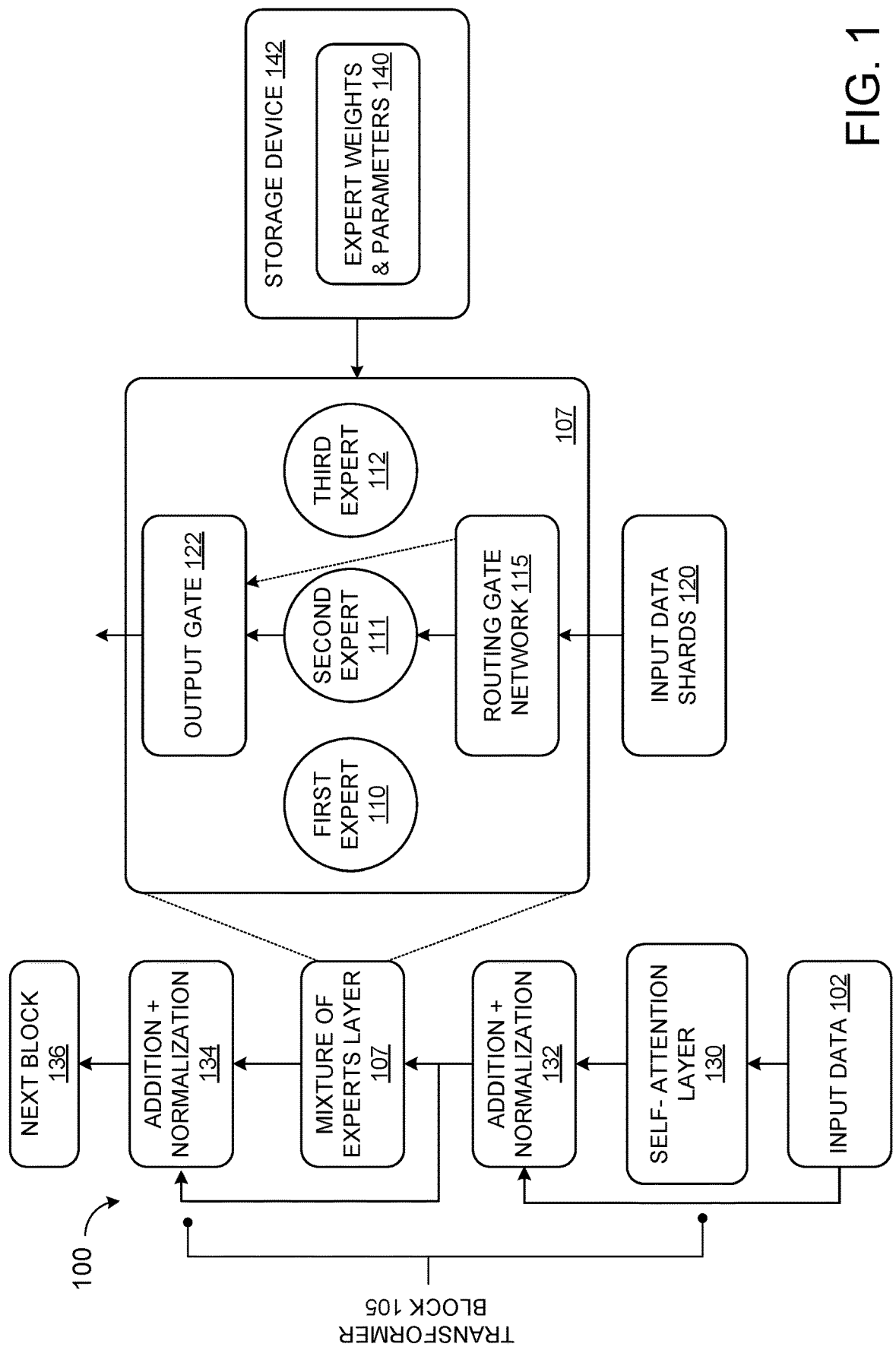
FIG. 1 schematically shows an example machine learning model including one or more mixture of experts layers.

Model quality in multi-modal scenarios and natural language processing models correlates strongly with the pertinent scale of the model. The scale of a model involves three main factors: the number of model parameters (excluding embeddings), the complexity and size of the underlying dataset, and the amount of compute resources. Increasing the parameter count of the model while keeping the complexity of the data and required compute constant has been shown to be effective at increasing model quality to a certain degree. For a given data complexity, a technique known as mixture of sparsely-activated experts (MoE) may be used to increase model parameters count at a fixed compute cost. However, while MoE models may be applied successfully to make training at scale more efficient, they yield severely low resource utilization during inference (e.g., <5%) due to load imbalance issues. As such, powerful compute clusters can't be leveraged to their full capacity.

MoE may be used to divide a problem space into smaller homogeneous regions, each assigned to one or more trained experts. For example, image detecting models may apply one neural network expert for human detection with another for pose estimation.

Not every input shard is passed to every expert within the mixture of experts. Rather, MoE models use localized routing algorithms to pass each input data shard (e.g., a patch of an image or a token in a sentence) to a specific expert. As such, not all experts may be active at one time. In this way, MoE inherently saves resources by using coarse grained sparsity at a software level by performing conditional computing based on the complexity of the input data. However, the gating process inherently incurs redundancy, potentially yielding only modest sparsity.

Machine learning models may employ numerous layers of MoEs. For facial recognition models, the first few layers may include general filters such as edge detectors. The last few layers may include more specialized experts for identifying parts of the face, such as lips, nose, ears etc. As such, at early stages, determining which expert receives an image patch may not matter as much as for later stages. As another example, natural language processing (NLP) systems may break text into tokens. Some tokens may be replaceable or have no inherent meaning on their own. If all tokens are treated with equal importance, they may be routed accurately, but at a high compute cost.

Multiple input data shards may thus be batched together for a single expert or group of experts in order to focus the hardware utilization in those layers. In contrast, for later layers, the accuracy of the routing mechanisms may be highly important. As such, depending on the properties of the input data and the layer of the model, it is important to predict where noise from more random patching can be tolerated, and where it cannot. Parsing the importance or complexity of each input data shard in early layers can allow for batching of less-important shards to more general experts, increasing utilization and conserving resources.

Transformer-based models are commonly used for implementing MoE models. Transformer models may be considered ensembles of shallow networks, such that some shards do not need to be parsed through all MoE layers to generate conclusions. More important or complex data shards may need to pass through more layers, and may be passed to more precisely trained experts. Properly directing these shards may allow for these resources to be allocated intelligently.

Herein, systems and methods are provided that enable MoE models to operate more efficiently and with a smaller footprint. In one example, individual nodes of the MoE are sparsified. In another example, perplexity of input data is used to determine which experts to load for subsequent processing. In another example, input data shards are batched by modality, allowing most relevant experts to be loaded.

FIG. 1 schematically shows an example machine learning system 100 configured to evaluate input data 102 with a sequence of transformer blocks 105, each transformer block comprising one or more MoE layers 107.

MoE may be considered an ensemble learning technique that implements the idea of training neural network experts (e.g., first expert 110, second expert 111, third expert 112) on subtasks of a predictive modeling problem. A task (e.g., image classification) may be divided into a plurality of subtasks. For each subtask, one or more neural network experts (110, 111, 112) may be trained to generate a prediction, e.g., a numerical value in the case of regression models or a class label in the case of classification models. Routing gate network 115 may comprise one or more gating models trained to decide which neural network expert to use given an input data shard 120. For an MoE layer 107, the output of the routing gate network 115 and any selected experts are pooled to generate a unified prediction at output gate 122. In general, only a few or even only one expert model is run at once, in contrast to ensemble techniques where results are combined from all available models.

Machine learning system 100 may be established on a Transformer architecture, and may comprise numerous repeated Transformer blocks (105, 136), where each block consists of a self-attention sub-layer 130, a first addition and normalization layer 132, a MoE layer 107 comprising fully connected feed-forward networks, and a second addition and normalization layer 134. Systems supporting MoE models on the transformer architecture, the properties of self-attention later 130 is generally fixed.

Input data is presented to self attention layer 130 and to addition and normalization later 132. Normalized data is then provided to MoE layer 107 and to second addition and normalization layer 134. The output of second addition and normalization layer 134 may be provided to a next transformer block 136. Depending on the configuration of system 100 and next transformer block 136, the output of second addition and normalization layer 134 may be received by a self-attention layer, a next MoE layer, a convolutional layer, etc.

Input data 102 may be divided into input data shards 120 (e.g., an image divided into patches, a sentence divided into tokens, etc.). For example, an image could be divided into separate elements such as background, foreground, objects, colors, lines, etc. However, when the input data elements are less distinct, the feature space can be divided more generically, or so that areas of expertise have increased overlap. Lower lavers of system 100 may be configured to extract features, and experts then called upon to evaluate those features.

Gating models, typically neural network models themselves, are trained alongside each expert to interpret the predictions made by each expert and to aid in deciding which expert to trust to make an accurate prediction for a given input. Routing gating network 115 may comprise a single shared gate, or may have multiple task-specific gates. For example, each routing gate may deploy Top-k functions to route the input shard to the k most relevant experts. For example, if there are 10 potential experts, and a top-2 function that selects 2 experts, it would establish 80% course-grain sparsity (e.g., 1-20% density).

Routing gate network 115 may take input data shards 120 as input, and outputs the contribution that each expert should have in making a prediction for each input data shard. The input data shards 120 are then passed to the appropriate experts. In this example, second expert 111 is selected to receive input data shards 120, but in other examples, the input data shards 120 may be routed to one or more different or additional experts.

When more than one expert is selected processes an input data shard, their outputs must be pooled to determine a value to output. This might include selecting the expert with the largest output or confidence provided by the routing gate network 115. The output of routing gate network 115 is also supplied to output gate 122, thus modulating the output of the selected experts. For example, a weighted sum prediction may be made that explicitly combines the predictions made by each expert and the confidence estimated by routing gate network 115. Routing gating network 115 may be configured to select a sparse combination of the experts to process each input data shard 120, e in order to sparsify system 100 in order to maintain the floating point operations per second (FLOPs).

Experts 110, 111, and 112 may comprise feed-forward neural networks each comprising own set of learnable expert weights and parameters 140. Such expert weights and parameters 140 may be curated on a storage device 142. Expert weights and parameters 140 may be maintained within storage device 142 and selectively retrieved by MoE layer 107 as specific experts are selected to evaluate input data shards. In this way, the footprint of transformer block 105 may be minimized, as opposed to loading all possible expert weights and parameters 140 even when the corresponding experts are not in use.

Self-attention layer 130 may apply a filter, and/or a vector of importance weights, that limits the amount of input data 102 accepted into transformer block 105 at one time. By moving the attention around, system 100 can handle large inputs. For example, images can be parsed piece by piece, long passages of texted can be evaluated across sentences or paragraphs. MoE layer 107, by evaluating input data shards 120 in this way, may be enabled to extract rich relationships between input data elements. When specific features are recognized, they may be passed to experts specialized in parsing those features. Using the attention vector, the correlation to other input features may be approximated.

Figure 2:
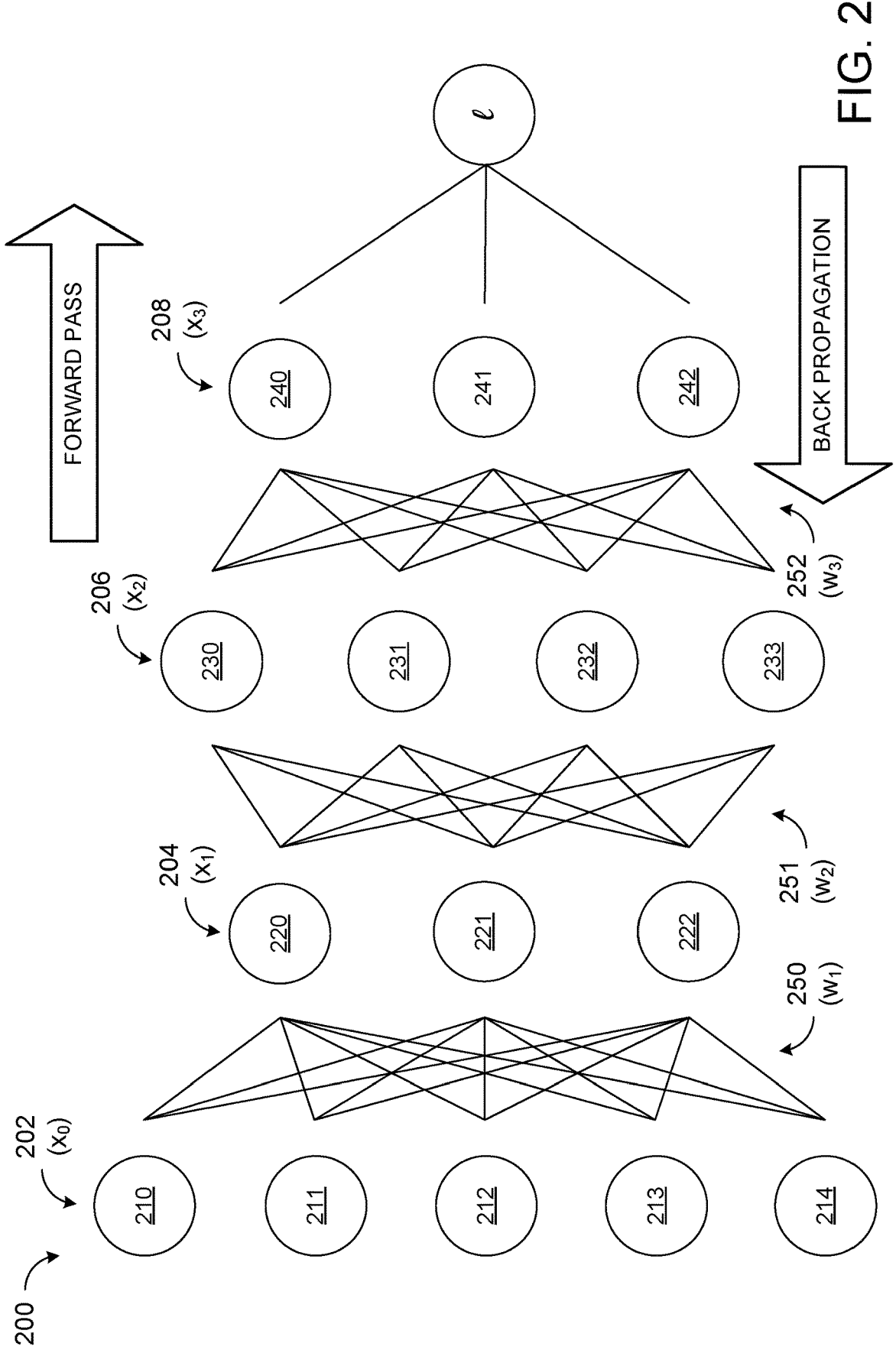
FIG. 2 schematically shows an example of a dense neural network.

As an example of experts 110, 111, and 112, FIG. 2 schematically shows a multilayer neural network 200, including an input layer ($x_0$) 202, two hidden layers ($x_1$) 204 and ($x_2$) 206, and an output layer ($x_3$) 208. In this example, input layer 202 includes 5 neurons (210, 211, 212, 213, 214), first hidden layer 204 includes 3 neurons (220, 221, 222), second hidden layer 206 includes 4 neurons (230, 231, 232, 233), and output layer 208 incudes 3 neurons (241, 242, 243).

Neural network 200 includes rectified linear units as activation functions. The forward pass includes a series of matrix-vector products $f(x0; w)$, where $x_0$ is the input or feature vector. The network function $f(x0; w)$ is parameterized by weight matrices $w_1$ 250, $w_2$ 251, and $w_3$ 252 and bias vectors. Each weight matrix includes a weight for each connection between two adjacent layers.

Figure 3:
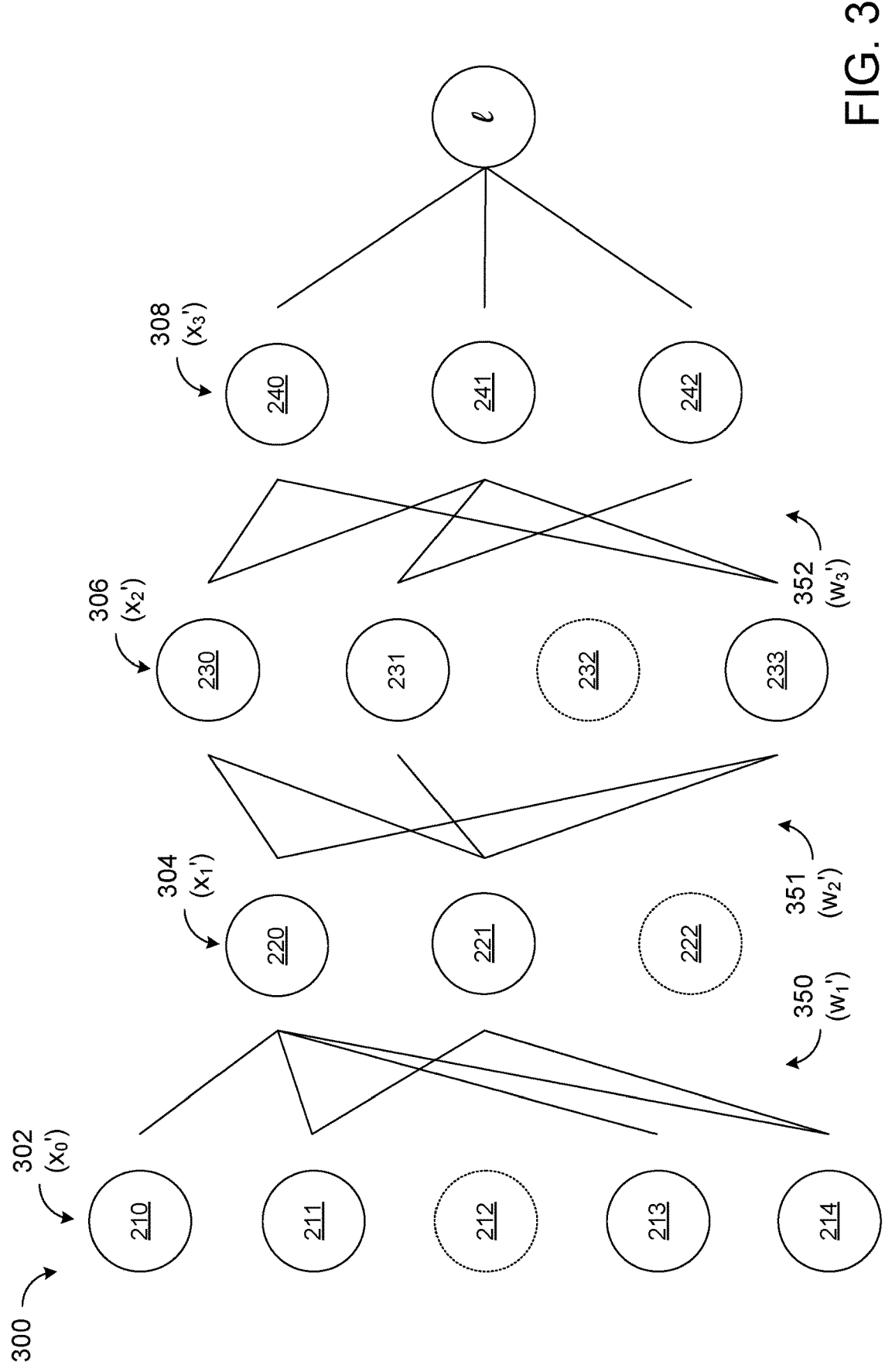
FIG. 3 schematically shows an example of sparsified neural network.

The sizes of deep neural networks such as network 200 are rapidly outgrowing the capacity of hardware to fast store and train them. Sparsity may be applied to reduce the number of network parameters initially, during training, and during inference by pruning edges from the underlying topology. FIG. 3 shows a sparsified version 300 of network 200, comprising hidden layer input layer ($x_0'$) 302, hidden layers ($x_1'$) 304 and ($x_2'$) 306, and output layer ($x_3'$) 308. In this example, the third input feature 212 and all of its adjacent weights are removed (dashed lines) from input layer ($x_0'$) 302. Additionally, hidden neurons 222 and 232 and their weights are removed from hidden layers ($x_1'$) 304 and ($x_2'$) 306, respectively. Various other weights have been removed from sparsified version 300, yielding weight matrices ($w_1'$) 350, ($w_2'$) 351, and ($w_3'$) 352. Removing neurons or input features in this way corresponds to removing rows or columns in the layer weight matrices. Removing individual weights corresponds to removing individual elements of the weight matrices. Sparsity may be induced or arise naturally, and may be applied to other tensors and matrices, such as matrices for activation, error, biases, etc. For activations, shutting off an activation for a node essentially generates a zero output. Sparsity as applied to activations works the same, e.g., activations that are a higher magnitude are of higher value to the network and are retained. In some examples, the activations approach sparsity naturally, so true sparsity can be added with modest impact.

Figure 4:
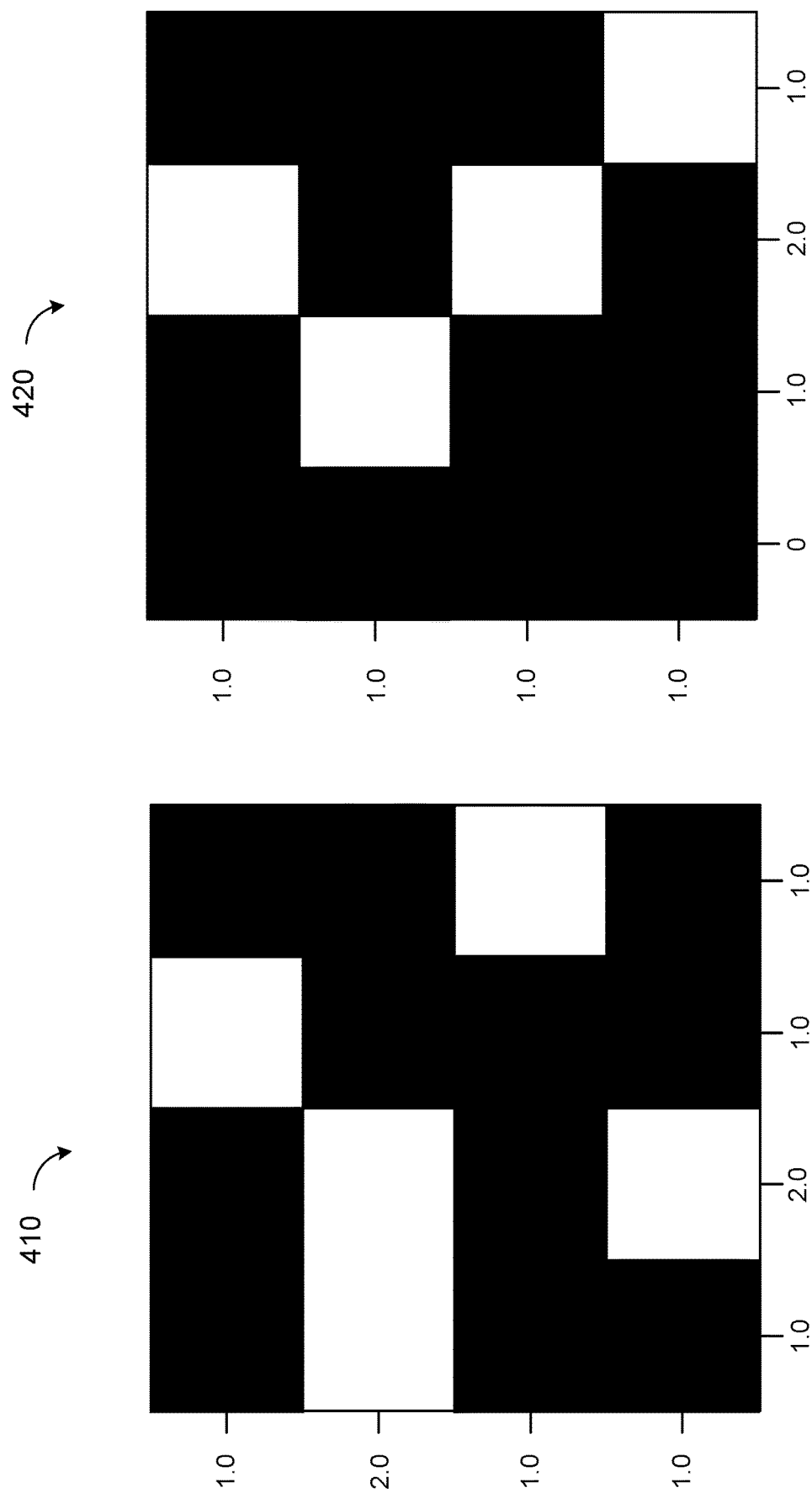
FIG. 4 schematically shows unstructured and balanced sparsity masks.

Sparsity may be unstructured or balanced. For unstructured sparsity, the mask has few constraints, and can essentially be configured in any random pattern. In FIG. 4, mask 410 is an example of unstructured sparsity. Each black square masks the underlying value to 0. Each white square allows the underlying value to be non-zero. The numbers on the axes of the grid are the counts for that row or column— e.g., how many non-zero values are present in that dimension. For example, the topmost row of mask 410 has one white square (non-zero value) and the second column from the left of mask 410 has two white squares (non-zero values). This convention is used throughout this disclosure.

Unstructured sparsity is typically applied after a network is trained but can also be applied during training in some circumstances. Unstructured sparsity is the least constraining form of sparsity, but its inherent randomicity makes it difficult to accelerate on the hardware level.

The most common constraint on balanced sparsity is N of M constraints. Therein, for a column or row that has M values, only N (N<M) can be non-zero. For example, mask 420 is an example of balanced sparsity with a value of N=1. Each row of mask 420 has one white square (non-zero value). The columns of mask 420 range from 0 to 2 non-zero values.

Balanced sparsity is thus more constrained than unstructured sparsity but is easier to accelerate with hardware because the hardware can anticipate what to expect from each constrained row or column. The known constraints can be pre-loaded into the hardware.

Herein, most examples may be considered balanced random fine grain sparsity. In this context, fine grain means that only a portion of the tensor is sparsified, while balanced means that all blocks (e.g., rows, columns) have the same level of sparsity, but within each block the pattern is random. This is opposed to unstructured sparsity, wherein the size of each sparsity block is equal to size of the tensor. As block size increases, so does fidelity, as different configurations can be represented with more flexibility. However, there are diminishing returns as block size increases past a threshold. Thus, balanced random fine grain sparsity represents an opportunity to establish a good balance between hardware implementation costs and accuracy. Further, balanced sparsity is scalable to different sparsity levels, and can be applied to weights, activations, errors, and gradients and may also have a scalable impact on training through selecting which tensors to sparsify.

MoE models may increase parameterization by only selectively loading some experts at once, based on the selection performed by the routing gate networks for a MoE layer. The level of coarse-grained sparsity in MoE models may be determined by taking a ratio of (n_topk/n_expert), where n_topk indicates the number of active experts designated by the routing gate networks to evaluate each input data shard and n_expert indicates the total number of experts in a layer. For a fixed n_topk and hidden dimension (H=n_expert*d_mlp where d_mlp is the dimension of each expert), there is a diminishing return in increasing the number of experts, thereby placing an upper bound on the coarse-grained sparsity level. Further, this ratio primarily represents the perspective of a single input data shard. If different associated shards enter a layer and are distributed among each expert within the layer, there is not really any course grain sparsity at all, as all of the weights for the layer end up being loaded anyways.

In current SOTA MoE models, each expert is locally dense. To further boost efficiency, we suggest using a balanced configuration of locally fine-grained sparse experts on top of the aforementioned coarse-grained sparsity (reducing the overhead of executing each expert). The effective global sparsity level, in turn, will be Sfine_grained*Scoarse_grained which can increase up to 99% sparsity.

Figure 5:
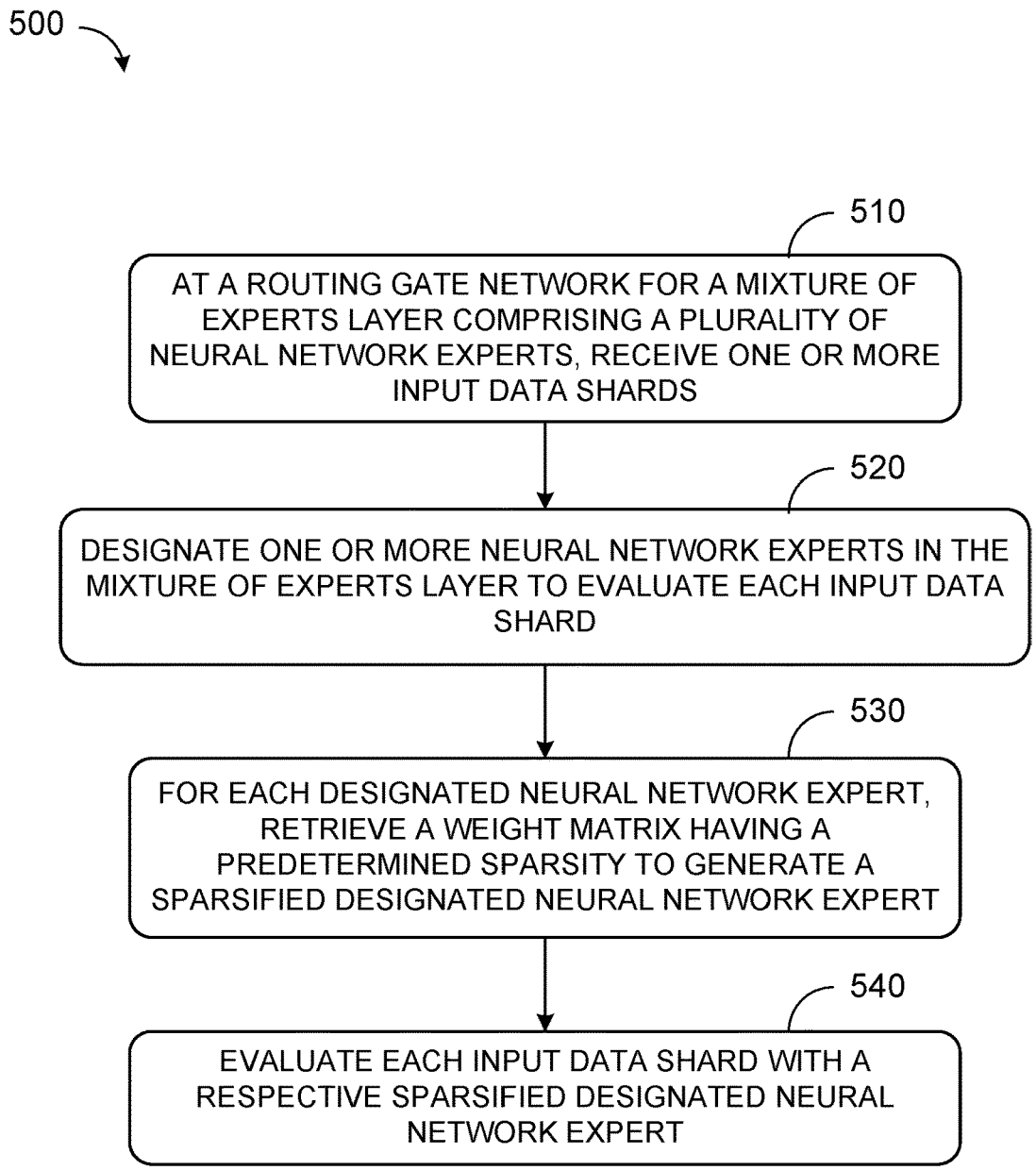
FIG. 5 is a flow diagram for an example method of operating a machine learning model including one or more mixture of experts layers.

FIG. 5 shows an example method 500 for operating a machine learning model including one or more mixture of experts layers, such as machine learning system 100. When implemented, method 500 may allow for a mixture of balanced, balance, fine grained sparsity and coarse grained sparsity that is inherent in MoE models.

At 510, method 500 includes, at a routing gate network for a mixture of experts layer comprising a plurality of neural network experts, receiving one or more input data shards. For example, the input data shards may include image patches, sentence tokens, etc., depending on the configuration of the machine learning model.

At 520, method 500 includes designating one or more neural network experts in the mixture of experts layer to evaluate each input data shard. For example, a number of designated neural network experts of the plurality of neural network experts may be based on a top-K function.

At 530, method 500 includes, for each designated neural network expert, retrieving a weight matrix having a predetermined sparsity to generate a sparsified designated neural network expert. In examples wherein the number of designated neural network experts of the plurality of neural network experts may be based on a top-K function, the predetermined sparsity may be based at least on a ratio of the top-K function to the total number of neural network experts.

In some examples, the predetermined sparsity may be configured as unstructured sparsity. Unstructured sparsity may yield the highest sparsity level for a fixed accuracy. In some examples, the predetermined sparsity is configured as balanced N of M sparsity (e.g., N elements out of every M subsequent elements are non-zero, as shown in FIG. 4). In such examples, each neural network expert may be implemented using hardware configured to implement balanced sparsity for a given block size.

As an example, the balanced N of M sparsity may have a block size M≥8, M≥16, etc. depending on the hardware configuration. As M increases, the balanced N:M pattern may asymptotically approach the efficiency of unstructured sparsity.

Figure 6:
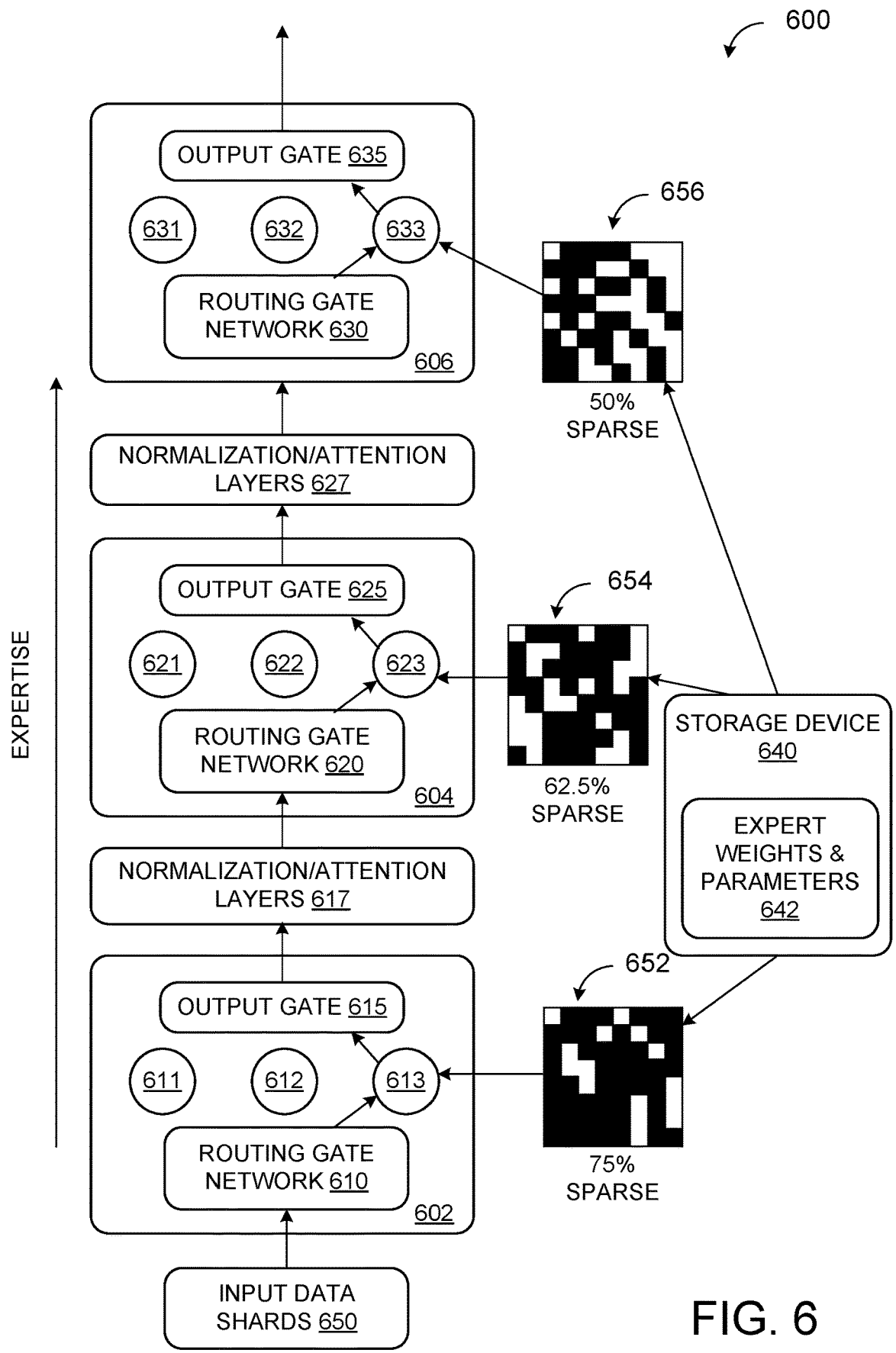
FIG. 6 schematically shows weight matrix sparsity levels correlating with neural network expert levels of expertise.

In some examples, the predetermined sparsity is based at least on a level of expertise of the designated neural network expert. For example, FIG. 6 schematically shows an example machine learning system 600, comprising a number of successive MoE layers (602, 604, 606). First MoE layer 602 includes a routing gate network 610, three experts (611, 612, 613), and an output gate 615. The output of output gate 615 may be routed to second MoE layer 604 via one or more normalization and/or attention layer 617. Second MoE layer 604 includes a routing gate network 620, three experts (621, 622, 623), and an output gate 625. The output of output gate 625 may be routed to third MoE layer 606 via one or more normalization and/or attention layer 627. Third MoE layer 606 includes a routing gate network 630, three experts (631, 632, 633), and an output gate 635. A storage device 640 is configured to store weights and parameters 642 for at least experts 611, 612, 613, 621, 622, 623, 631, 632, and 633. While described primarily with regard to weight matrices, expert weights and parameters may include activation matrices, gradients, errors, and/or other parameters to which sparsity may be applied. MoE Layers 602, 604, and 606 may be considered to have experts with increasing expertise. In other words, experts 611, 612, and 613 may be the most generalized, while experts 631, 632, and 633 may be the most specialized. As such, experts in MoE layer 602 may allow for more noise and sparsity than for experts in MoE layers 604 and 606.

Input data shards 650 are received at routing gate network 610, which designated expert 613 to evaluate the input data shards. MoE layer 602 may then retrieve a sparsified weight matrix 652 from storage device 640, which may generate sparsified weight matrix 652 from a dense weight matrix. Expert 613 may then be sparsified and evaluate the input data shards 650 as such. In this example, sparsified weight matrix 652 has a 75% sparsity.

Expert 613 may then output data to output gate 615, which directs the data to routing gate network 620 via normalization and attention layers 617. Routing gate network 620 may designated expert 623 to evaluate the input data. MoE layer 604 may then retrieve a sparsified weight matrix 654 from storage device 640. Sparsified weight matrix 654 may be less sparse (62.5%) than sparsified weight matrix 652, commensurate with a higher degree of expertise.

Expert 623 may then output data to output gate 625, which directs the data to routing gate network 630 via normalization and attention layers 627. Routing gate network 630 may designated expert 633 to evaluate the input data. MoE layer 606 may then retrieve a sparsified weight matrix 656 from storage device 640. Sparsified weight matrix 656 may be less sparse (50%) than sparsified weight matrix 652 or 654, commensurate with an even higher degree of expertise.

Returning to FIG. 5, at 540, method 500 includes, evaluating each input data shard with a respective sparsified designated neural network expert. In some examples, evaluating each input data shard includes performing inference on the input data shards. Additionally or alternatively, each input data shard may be evaluated as part of training the respective neural network expert.

Once the sparsified matrices are loaded, they will be used to perform vector matrix multiplications, which can be executed much faster when sparsified, reducing the amount of compute necessary to evaluate each input data shard. Further, by sparsifying the weights and/or parameters for each expert, the experts may be loaded faster, thus decreasing end-to-end latency. In particular, when performing inference, the loading of weights and parameters contributes more to latency than does the multiplication itself.

As described with regard to FIG. 1, transformer blocks are a common topology used in numerous different fields (e.g., computer vision, NLP). Transformer-based models may be considered to be an ensemble of shallow networks. In other words, input samples may take different routes based on their perplexity. Less perplexing data shards may be able to skip layers and/or exit the entire network early. In this way, redundant or inconsequential computing can be avoided for samples that do not require evaluation at each and every block of the model.

Figure 7:
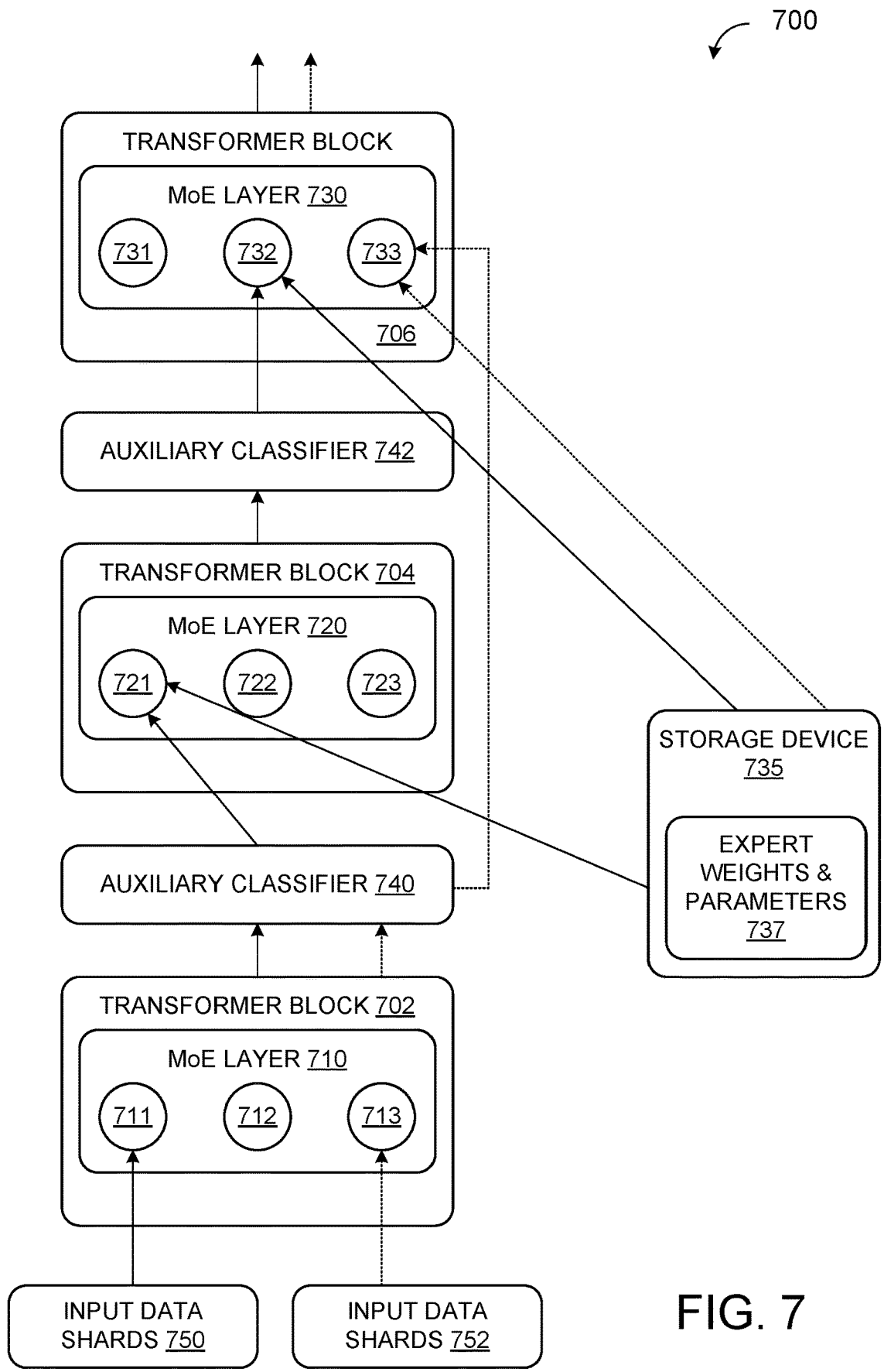
FIG. 7 schematically shows an example machine learning system configured to pre-load expert weights based on input data perplexity.

FIG. 7 schematically shows an example machine learning system 700 configured to pre-load expert weights based on input data perplexity. Machine learning system 700 features three successive transformer blocks, transformer block 702, transformer block 704 and transformer block 706. Transformer block 702 includes MoE layer 710, including three experts 711, 712, and 713. Transformer block 704 includes MoE layer 720, including three experts 721, 722, and 723. Transformer block 706 includes MoE layer 730, including three experts 731, 732, and 733. Storage device 735 is configured to store weights and parameters 737 for each of the experts in machine learning system 700.

Transformer block 702 feeds into auxiliary classifier 740, while transformer block 704 feeds into auxiliary classifier 742. In other examples, such as systems wherein transformer blocks are aligned with pipeline parallelism, each group of parallel blocks may feed into an auxiliary classifier. Each auxiliary classifier may analyze the data shards that were evaluated by the preceding block, and indicate one or more likelihoods that experts at one or more subsequent layers will next evaluate the data shards based on their perplexity at the current block.

In the example of FIG. 7, input data shards 750 may be considered higher perplexity data shards, while input data shards 752 may be considered lower perplexity data shards. Input data shards 750 are received at transformer block 702 and processed by expert 711 in MoE layer 710. The processed input data shards are then evaluated by auxiliary classifier 740. Auxiliary classifier 740 determines that input data shards 750 are of high perplexity and assigns them to expert 721 in MoE layer 720 in subsequent transformer block 704. Transformer block 704 can thus fetch the weights and parameters for expert 721 from storage device 735. Subsequently, auxiliary classifier 742 may assign input data shards 750 to expert 732 in MoE layer 730 in subsequent transformer block 706. Transformer block 706 can thus fetch the weights and parameters for expert 732 from storage device 735.

In this way, relevant weights may be pre-fetched for likely to be used experts of subsequent layers. This may significantly reduce the end-to-end latency of inference generating models. When applied to training and fine-tuning models, this methodology may reduce the amount of time spent in both forwards and backward paths for each iteration.

Input data shards 752 may be received at transformer block 702 and processed by expert 713 in MoE layer 710. The processed input data shards are then evaluated by auxiliary classifier 740. Auxiliary classifier 740 determines that input data shards 752 are of low perplexity, and are a candidate for early exit from machine learning system 700. Input data shards may thus bypass transformer block 704 and be assigned for processing by expert 733 in MoE layer 730 in transformer block 706. Transformer block 706 can thus fetch the weights and parameters for expert 733 from storage device 735.

In the example of FIG. 7, input data shards 750 may be considered higher perplexity data shards, while input data shards 752 may be considered lower perplexity data shards. Input data shards 750 are received at transformer block 702 and processed by expert 711 in MoE layer 710. The processed input data shards are then evaluated by auxiliary classifier 740. Auxiliary classifier 740 determines that input data shards 750 are of high perplexity, and assigns them to expert 721 in MoE layer 720 in subsequent transformer block 704. Transformer block 704 can thus fetch the weights and parameters for expert 721 from storage device 735. For example, storage device 740 may receive a request for a sparsified weight matrix having a predetermined sparsity, retrieve the requested stored weight matrix, sparsify the retrieve stored matrix, and provide the sparsified stored weight matrix for expert 721. Subsequently, auxiliary classifier 742 may assign input data shards 750 to expert 732 in MoE layer 730 in subsequent transformer block 706. Transformer block 706 can thus fetch the weights and parameters for expert 732 from storage device 735.

In this way, relevant weights may be pre-fetched for likely to be used experts of subsequent layers. This may significantly reduce the end-to-end latency of inference generating models. When applied to training and fine-tuning models, this methodology may reduce the amount of time spent in both forwards and backward paths for each iteration.

Input data shards 752 may be received at transformer block 702 and processed by expert 713 in MoE layer 710. The processed input data shards are then evaluated by auxiliary classifier 740. Auxiliary classifier 740 determines that input data shards 752 are of low perplexity, and are a candidate for early exit from machine learning system 700. Input data shards may thus bypass transformer block 704 and be assigned for processing by expert 733 in MoE layer 730 in transformer block 706. Transformer block 706 can thus fetch the weights and parameters for expert 733 from storage device 735. In this way, low perplexity data can avoid redundant or unnecessary processing, exit the transformer blocks early, allowing for re-allocation of resources to higher perplexity data.

Figure 8:
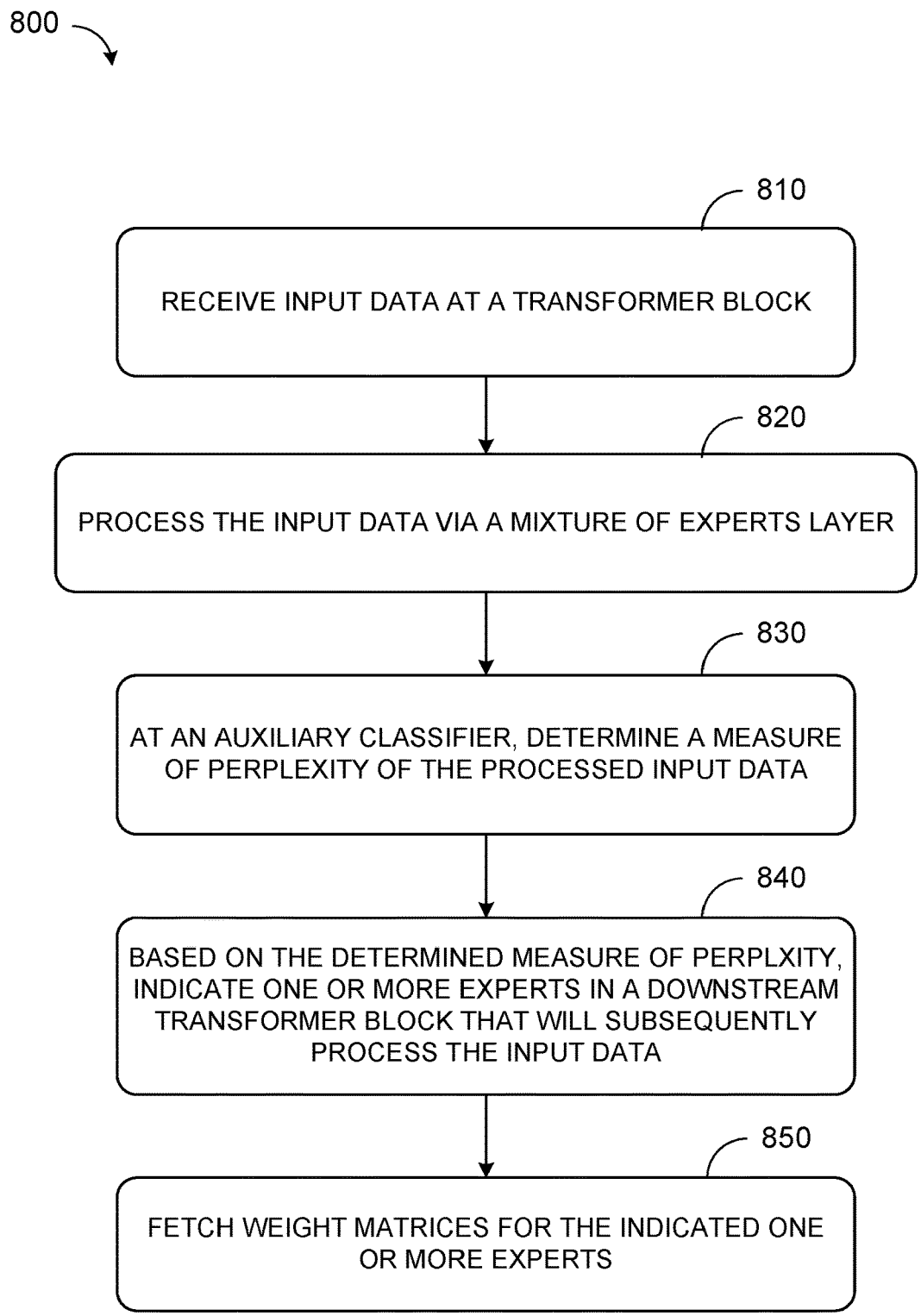
FIG. 8 is a flow diagram for an example method of pre-loading expert weights based on input data perplexity.

FIG. 8 shows an example method 800 for operating a machine learning model including a plurality of sequential transformer blocks, such as system 700. When implemented, method 800 may allow a machine learning model to predict which, if any, experts at a subsequent transformer block will be active to process a particular input given the perplexity of the input at the current layer.

At 810, method 800 includes receiving input data at a transformer block. For example, the input data may include image data, NLP data, etc., depending on the configuration of the machine learning model. Continuing at 820, method 800 includes processing the input data via a mixture of experts layer. In some examples, processing the input data includes performing inference on the input data. Additionally or alternatively, the input data may be evaluated as part of training and/or fine tuning the machine learning model.

At 830, method 800 includes, at an auxiliary classifier, determining a measure of perplexity of the processed input data. For example, the measure of perplexity may be a loss function, such as a cross-entropy loss function. In some examples, the measure of perplexity is determined for a single input data shard, such as a token. Additionally or alternatively, the measure of perplexity may be determined for a group of input data shards, such as a sentence or group of words or sentences.

At 840, method 800 includes, based on the determined measure of perplexity, indicating one or more experts in a downstream transformer block that will subsequently process the input data. In some examples, the measure of perplexity will be used to indicate whether a specialized or more generalized expert will subsequently process the input data. For example, input data shards with lower perplexity can afford additional added noise and be routed to whichever expert is available or is already loaded, while input data shards with higher perplexity will benefit from highly accurate routing.

In some examples, the downstream transformer block is a next transformer block. However, in some examples, based on the determined measure of perplexity, it may be indicated that the input data is likely to bypass one or more transformer blocks of the plurality of sequential transformer blocks. In some examples, based on the determined measure of perplexity, a top k selection may be performed to select one of the one or more experts that will subsequently process the input data. However, in many examples, the determined measure of perplexity will allow for bypassing or eliminating localized routing mechanisms, so that localized top k selections do not need to be performed at each layer. In this way, hardware utilization can be driven up by improving scheduling based on perplexity.

At 850, method 800 includes fetching weight matrices for the indicated one or more experts. Fetching weight matrices for the indicated one or more experts may include fetching sparsified weights based on the determined measure of perplexity. For example, lower perplexity input data may allow for more sparsified weights to be fetched, while higher perplexity input data may benefit from fetching more dense weight matrices.

Another problem associated with MoE models is batching during inference time. Generative inferencing is memory-limited, rather than compute limited. Particularly for multi-modal neural networks, shards within each batch of input data require access to different experts. For example, the input data may include image data along with associated text, or video data that also includes audio data and captions.

The MoE model may include some experts that stretch across different modalities, but will also include specialized experts for each modality. For example, not every expert in image recognition will also be an expert in NLP processing. Even withing text models, different experts may be deployed for each possible language, and not all will be experts in all languages.

For such data sets, it may not be efficient to load experts in all possible modalities at all times. Further, it may not be efficient to load an expert for a single input data shard, then unload the expert, only have to re-load the expert when the next relevant input data shard is queued. As such, routing the input data to the most relevant expert is challenging and requires high-level scheduling.

Figure 9:
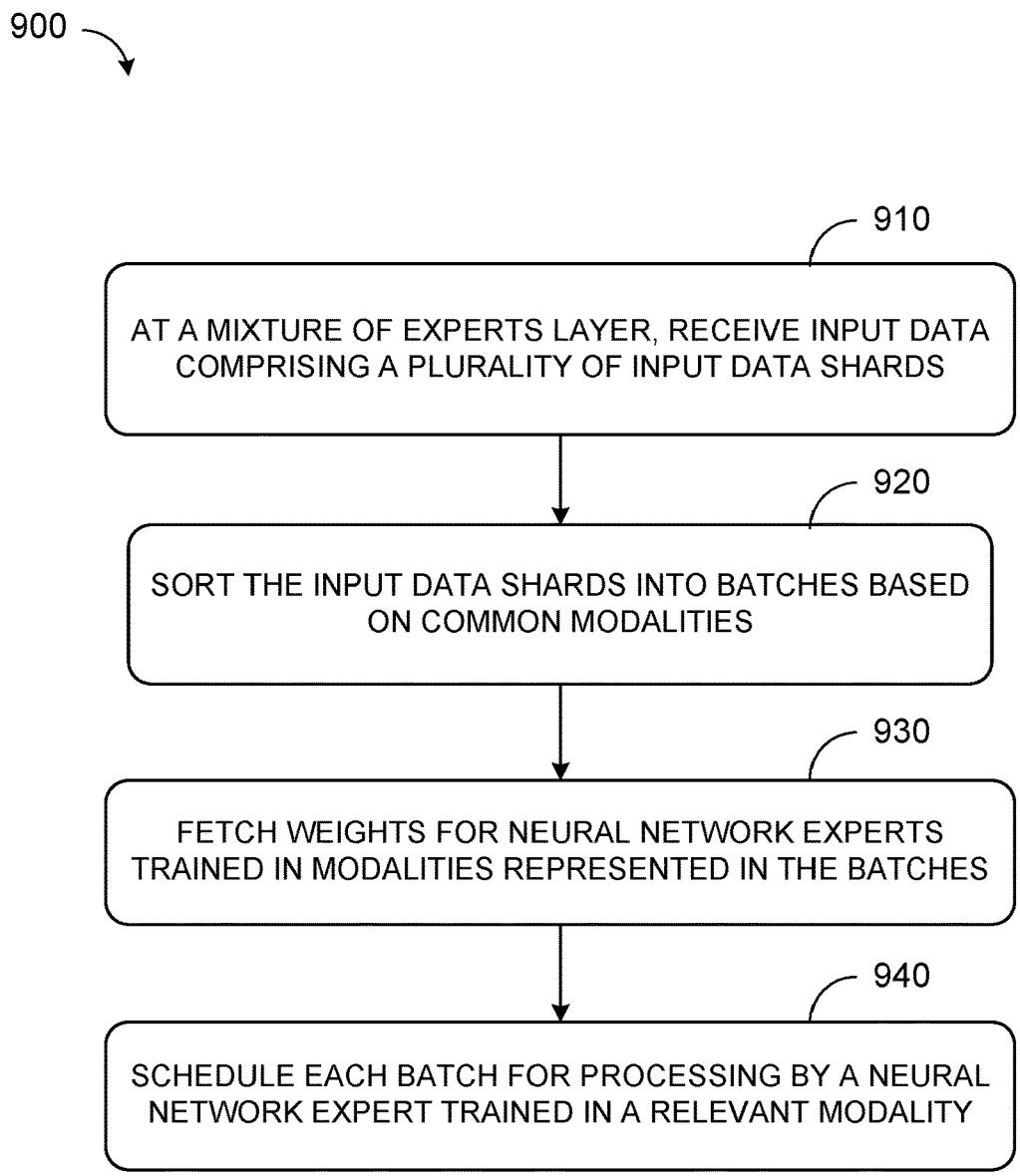
FIG. 9 is a flow diagram for an example method of operating a machine learning system.

FIG. 9 is a method 900 for operating a machine learning model. When implemented, method 900 may allow a machine learning model to batch input shards by modality, allowing for selective loading and scheduling of experts.

At 910, method 900 includes, at a mixture of experts layer, receiving input data comprising a plurality of input data shards. For example, the machine learning model may be configured to receive input data from different machine learning domains (e.g., modalities) corresponding to different machine learning tasks, such as speech recognition, image classification, machine translation, or parsing.

At 920, method 900 includes sorting the input data shards into batches based on common modalities. For example, the input data shards may be sorted into batches such as speech, images, language, text, etc., or batches such as English, Spanish, Chinese, Arabic, etc.

At 930, method 900 includes fetching weights for neural network experts trained in modalities represented in the batches. For example, for input data including video of people talking, weights may be retrieved for one or more experts in speech recognition and image classification.

At 940, method 900 includes scheduling each batch for processing by a neural network expert trained in a relevant modality. Scheduling each batch for processing by a neural network expert trained in a relevant modality may be performed by a reinforcement learning agent, and/or any suitable online or offline learning algorithm. In some examples, the reinforcement learning agent and/or other learning algorithm is trained in load-balancing. In this way, constraints are placed on the processing pathway. Some experts are eliminated from the process, and their potential inputs are preferentially direct towards other experts.

In some examples, method 900 may include maintaining the fetched weights for each neural network expert at a node based on a relevant batch processing schedule. For example, an expert may be maintained at a node until the completion of a batch. Additionally or alternatively, method 900 may include unloading the fetched weights from the node following processing of a batch. In some examples, method 900 may subsequently include fetching weights for a different neural network expert to be loaded onto the node. In this way, the total number of nodes that are to be maintained in the machine learning model may be fewer than the total number of experts available to the machine learning model.

By routing input data in this way, the overlap between the selected experts increases, and the total number of experts and/or the diversity of experts loaded to process a set of input data decreases. As described with regard to FIGS. 5 and 6, fetching weights may include fetching sparsified weight matrices. As such, loading them from memory reduces both the memory footprint and the loading time, further improve the end-to-end performance. The loading process can be overlapped with other compute processes, as the model can predict what's going to happen, and thus overlap the communication between the storage machine and the compute nodes.

Figure 10:
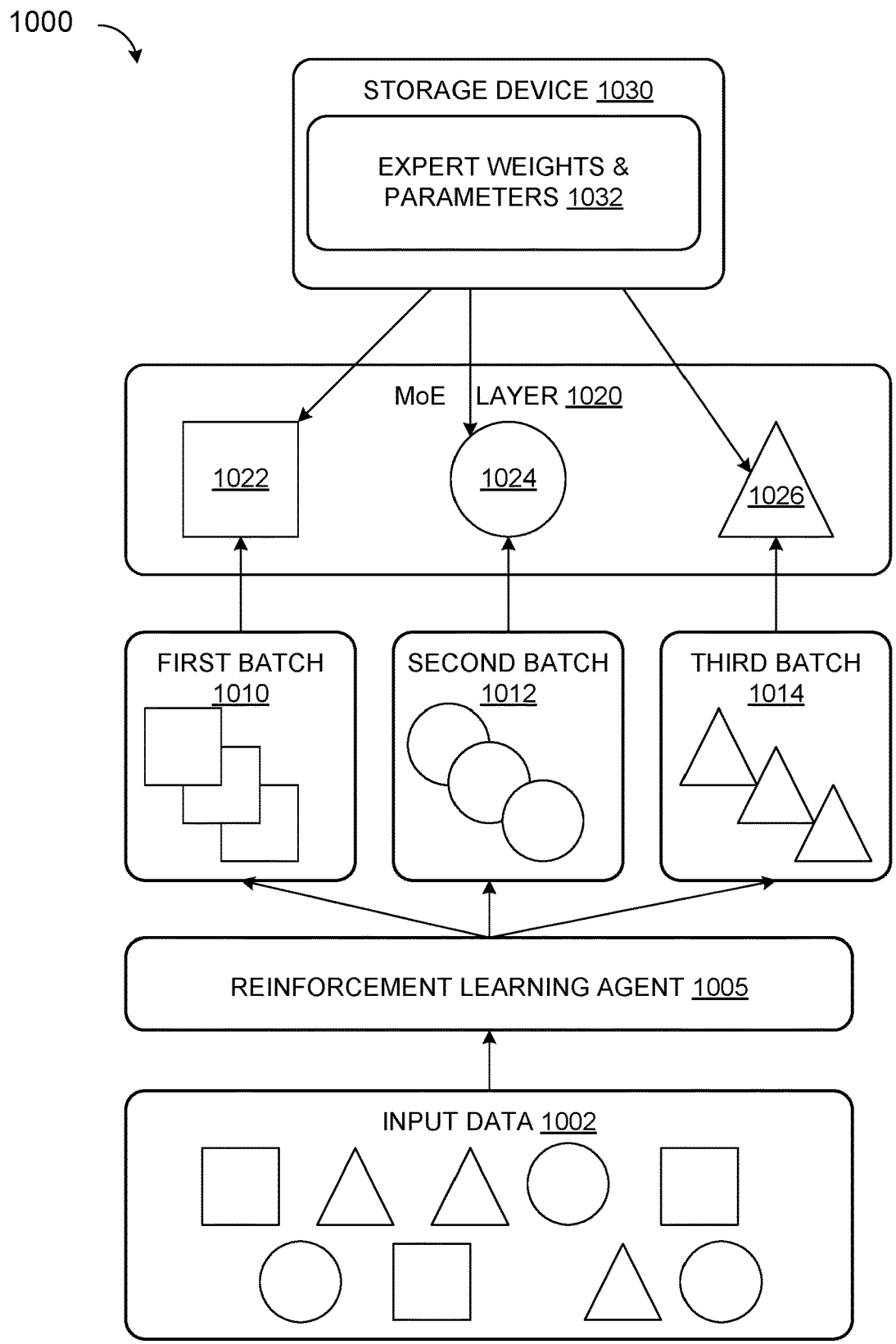
FIG. 10 schematically shows an example machine learning system configured to batch input data shards based on modality.

As an example, FIG. 10 schematically shows an example machine learning system 1000 configured to batch and schedule processing of input data shards by modality. Input data 1002 comprising a plurality of input data shards of various modalities is evaluated by reinforcement learning agent 1005. Reinforcement learning agent 1005 divides the input data shards into batches. In this example, there are three batches—first batch 1010 (squares), second batch 1012 (circles), and third batch 1014 (triangles).

Reinforcement learning agent 1005 may provide an indication as to which experts should be loaded into nodes 1022, 1024, and 1026 of MoE layer 1020. MoE layer 1020 fetches weights from storage device 1030 which is configured to store expert weights and parameters 1032. In this way, node 1022 is configured to process first batch 1010, node 1024 is configured to process second batch 1012, and node 1026 is configured to process third batch 1014.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
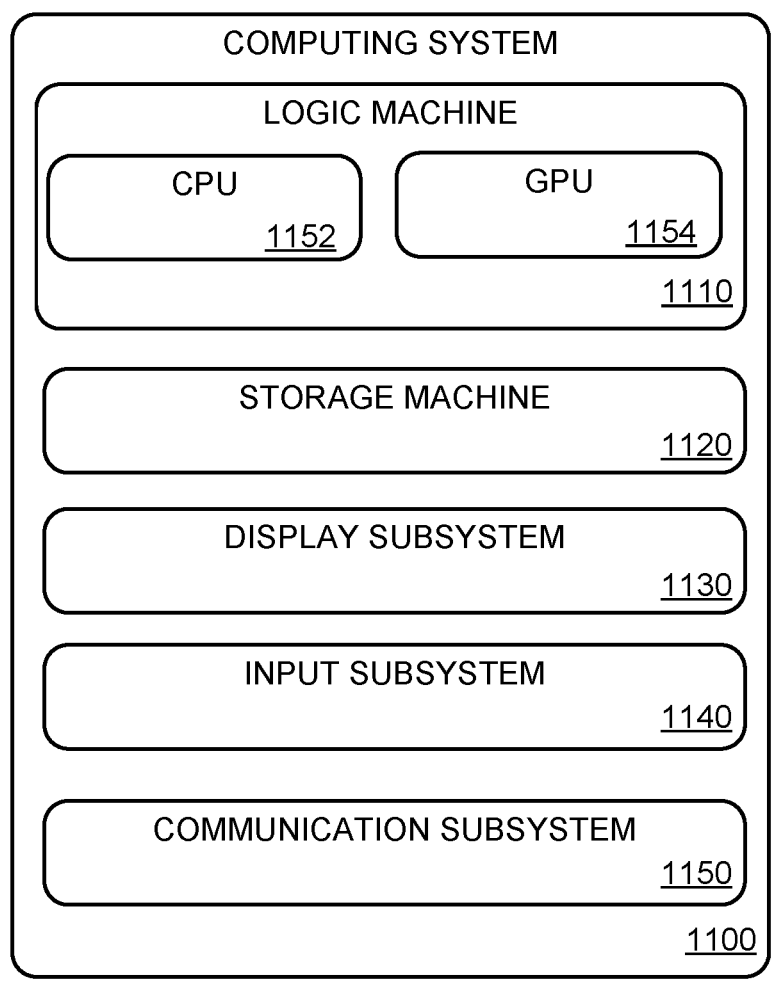
FIG. 11 shows an example computing system.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices. Systems 100, 200, and 300, 600, 700, and 1000 may be examples of computing system 1100.

Computing system 1100 includes a logic machine 1110 and a storage machine 1120. Computing system 1100 may optionally include a display subsystem 1130, input subsystem 1140, communication subsystem 1150, and/or other components not shown in FIG. 11.

Logic machine 1110 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

The logic subsystem may include one or more CPUs 1152 in addition to one or more GPUs 1154, and the one or more CPUs 1152 may be configured to send executable instructions and/or data to the one or more GPUs 1154. Responsive to processing of the instructions and/or data by the one or more GPUs 1154, the CPUs 1152 may receive result data from the one or more GPUs 1154. In this manner, the logic subsystem may execute a large number of computations in parallel via the GPUs. In particular, the logic subsystem may efficiently perform method 500 of FIG. 5, method 800 of FIG. 8, and method 900 of FIG. 9.

The present disclosure refers to a GPU as a computing device well-suited for distributed learning processes, because a GPU is configured to execute a very large number of multiple replicated instances of the same program (e.g., a GPU kernel) in parallel, where each instance of the program receives and works on different input data. However, it is to be understood that other aspects of a logic subsystem may be configured to provide the same or similar benefits. As such, it is to be understood that any discussion of GPUs also applies to other suitable computing components, and the present disclosure is in no way limited to performing methods 500, 800, 900, or any other aspect of training a machine-learning model on GPUs to the exclusion of other suitable computing devices.

Storage machine 1120 includes one or more physical devices configured to hold instructions executable by the logic machine to implement the methods and processes described herein. When such methods and processes are implemented, the state of storage machine 1120 may be transformed—e.g., to hold different data. Storage devices 142, 640, 735, and 1030 may be examples of storage machine 1120.

Storage machine 1120 may include removable and/or built-in devices. Storage machine 1120 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1120 may include volatile, nonvolatile, dynamic, static, read/write, read-only, random-access, sequential-access, location-addressable, file-addressable, and/or content-addressable devices.

It will be appreciated that storage machine 1120 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1110 and storage machine 1120 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 implemented to perform a particular function. In some cases, a module, program, or engine may be instantiated via logic machine 1110 executing instructions held by storage machine 1120. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across multiple user sessions. A service may be available to one or more system components, programs, and/or other services. In some implementations, a service may run on one or more server-computing devices.

When included, display subsystem 1130 may be used to present a visual representation of data held by storage machine 1120. This visual representation may take the form of a graphical user interface (GUI). As the herein described methods and processes change the data held by the storage machine, and thus transform the state of the storage machine, the state of display subsystem 1130 may likewise be transformed to visually represent changes in the underlying data. Display subsystem 1130 may include one or more display devices utilizing virtually any type of technology. Such display devices may be combined with logic machine 1110 and/or storage machine 1120 in a shared enclosure, or such display devices may be peripheral display devices.

When included, input subsystem 1140 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1150 may be configured to communicatively couple computing system 1100 with one or more other computing devices. Communication subsystem 1150 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

In one example, a method for operating a machine learning model including a plurality of sequential transformer blocks, comprises receiving input data at a transformer block; processing the input data via a mixture of experts layer; at an auxiliary classifier, determining a measure of perplexity of the processed input data; based on the determined measure of perplexity, indicating one or more experts in a downstream transformer block that will subsequently process the input data; and fetching weight matrices for the indicated one or more experts. In such an example, or any other example, fetching weight matrices for the indicated one or more experts additionally or alternatively includes fetching sparsified weights based on the determined measure of perplexity. In any of the preceding examples, or any other example, the downstream transformer block is additionally or alternatively a next transformer block. In any of the preceding examples, or any other example, the method additionally or alternatively comprises indicating that the input data is likely to bypass one or more transformer blocks of the plurality of sequential transformer blocks. In any of the preceding examples, or any other example, the method additionally or alternatively comprises performing a top k selection to select one of the one or more experts that will subsequently process the input data. In any of the preceding examples, or any other example, the measure of perplexity is additionally or alternatively determined for a single input data shard. In any of the preceding examples, or any other example, the measure of perplexity is additionally or alternatively determined for a group of input data shards. In any of the preceding examples, or any other example, the measure of perplexity is additionally or alternatively a loss function. In any of the preceding examples, or any other example, the loss function is additionally or alternatively a cross-entropy loss function. The technical effect of implementing this method is an improvement in the use of computing resources.

In another example, a method for operating a machine learning model comprises, at a mixture of experts layer, receiving input data comprising a plurality of input data shards; sorting the input data shards into batches based on common modalities; fetching weights for neural network experts trained in modalities represented in the batches; and scheduling each batch for processing by a neural network expert trained in a relevant modality. In such an example, or any other example, the method additionally or alternatively comprises maintaining the fetched weights for each neural network expert at a node based on a relevant batch processing schedule. In any of the preceding examples, or any other example, the method additionally or alternatively comprises unloading the fetched weights from the node following processing of a batch; and fetching weights for a different neural network expert to be loaded onto the node. In any of the preceding examples, or any other example, fetching weights additionally or alternatively includes fetching sparsified weight matrices. In any of the preceding examples, or any other example, scheduling each batch for processing by a neural network expert trained in a relevant modality is additionally or alternatively performed by a reinforcement learning agent. In any of the preceding examples, or any other example, the reinforcement learning agent is additionally or alternatively trained in load-balancing. The technical effect of implementing this method is an improvement in the use of computing resources.

In yet another example, a machine learning model comprises a plurality of sequential transformer blocks configured to receive input data, each transformer block comprising: a mixture of experts layer configured to process the input data; and an auxiliary classifier configured to determining a measure of perplexity of the processed input data; and one or more processors configured to, based on the determined measure of perplexity, indicate one or more experts in a downstream transformer block that will subsequently process the input data; and fetch weight matrices for the indicated one or more experts. In such an example, or any other example, fetching weight matrices for the indicated one or more experts additionally or alternatively includes fetching sparsified weights based on the determined measure of perplexity. In any of the preceding examples, or any other example, the one or more processors are additionally or alternatively configured to indicate that the input data is likely to bypass one or more transformer blocks of the plurality of sequential transformer blocks. In any of the preceding examples, or any other example, the measure of perplexity is additionally or alternatively determined for a group of input data shards. In any of the preceding examples, or any other example, the measure of perplexity is additionally or alternatively a loss function. The technical effect of implementing this machine learning model is an improvement in the use of computing resources.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for operating a machine learning model including a plurality of sequential transformer blocks, comprising:
   receiving input data at a transformer block;
   processing at least a portion of the input data via a mixture of experts layer;
   at an auxiliary classifier, determining a measure of perplexity of the processed input data;
   based on the determined measure of perplexity, indicating one or more experts of a group of experts in a downstream transformer block that will subsequently process at least a portion of the processed input data;
   fetching sparsified weight matrices for the indicated one or more experts of the group of experts to generate one or more sparsified experts, wherein a level of sparsity for the sparsified weight matrices is based on the determined measure of perplexity; and
   further processing at least a portion of the processed input data via the one or more sparsified experts to generate a prediction.

2. The method of claim 1, wherein the downstream transformer block is a next transformer block.

3. The method of claim 1, further comprising:
   indicating that the processed input data is likely to bypass one or more transformer blocks of the plurality of sequential transformer blocks.

4. The method of claim 1, further comprising:
   performing a top k selection to select one of the one or more experts of the group of experts that will subsequently process the input data.

5. The method of claim 1, wherein the measure of perplexity is determined for a single input data shard.

6. The method of claim 1, wherein the measure of perplexity is determined for a group of input data shards.

7. The method of claim 1, wherein the measure of perplexity is a loss function.

8. The method of claim 7, wherein the loss function is a cross-entropy loss function.

9. A method for operating a machine learning model, comprising:
   at a mixture of experts layer, receiving input data comprising a plurality of input data shards;
   sorting the input data shards into batches based on common modalities;
   fetching sparsified weight matrices for one or more selected neural network experts of a group of neural network experts, to generate one or more sparsified selected neural network experts, the selected neural network experts trained in modalities represented in the batches;
   scheduling each batch for processing by one or more sparsified selected neural network experts trained in a relevant modality; and
   processing at least a portion of each batch via respective sparsified selected neural network experts to generate a prediction.

10. The method of claim 9, further comprising:
    maintaining the fetched sparsified weight matrices for each sparsified selected neural network expert at a node based on a relevant batch processing schedule.

11. The method of claim 10, further comprising:
    unloading the fetched sparsified weight matrices from the node following processing of a batch; and
    fetching sparsified weights for a different selected neural network expert to be loaded onto the node.

12. The method of claim 9, wherein scheduling each batch for processing by one or more sparsified selected neural network experts trained in a relevant modality is performed by a reinforcement learning agent.

13. The method of claim 12, wherein the reinforcement learning agent is trained in load-balancing.

14. A computing system, comprising:
    one or more processors; and
    a storage machine having instructions stored thereon executable by the one or more processors to instantiate a machine learning model, comprising:
    a plurality of sequential transformer blocks configured to receive input data, each transformer block comprising:
    a mixture of experts layer configured to process the input data; and an auxiliary classifier configured to determining a measure of perplexity of the processed input data; and wherein the one or more processors are configured to:
based on the determined measure of perplexity, indicate one or more experts of a group of experts in a downstream transformer block that will subsequently process at least a portion of the processed input data;

fetch sparsified weight matrices for the indicated one or more experts of the group of experts to generate one or more sparsified experts, wherein a level of sparsity for the sparsified weight matrices is based on the determined measure of perplexity; and further process at least a portion of the processed input data via the one or more sparsified experts to generate a prediction.

15. The computing system of claim 14, wherein the one or more processors are further configured to:
indicate that the processed input data is likely to bypass one or more transformer blocks of the plurality of sequential transformer blocks.

16. The computing system of claim 14, wherein the measure of perplexity is determined for a group of input data shards.

17. The computing system of claim 14, wherein the measure of perplexity is a loss function.

18. The method of claim 1, wherein sparsified weight matrices fetched for experts indicated for processing processed input data with a low level of perplexity have a greater level of sparsity as compared to sparsified weight matrices fetched for experts indicated for processing processed input data with a high level of perplexity.

* * * * *